J. L. SKINNER.
Dampers and Ventilators.

No. 141,601. Patented August 5, 1873.

Attest
A. H. Evans
Calvin Nash

Inventor
John L. Skinner
per A. H. & R. K. Evans
Attorneys.

UNITED STATES PATENT OFFICE.

JOHN L. SKINNER, OF AMBOY, ILLINOIS.

IMPROVEMENT IN DAMPERS AND VENTILATORS.

Specification forming part of Letters Patent No. 141,601, dated August 5, 1873; application filed May 31, 1873.

*To all whom it may concern:*

Be it known that I, JOHN L. SKINNER, of Amboy, in the State of Illinois, have invented a new and useful Improvement in Dampers and Ventilators, of which the following is a clear, full, and exact description, reference being had to the accompanying drawings as a part of this specification, in which—

Figure 1:
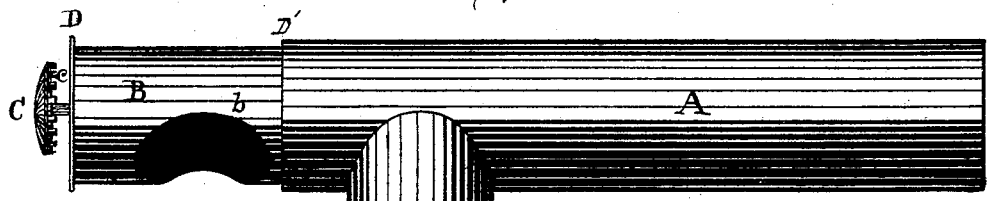
Figure 2:
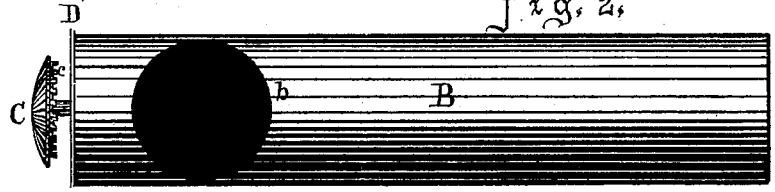
Figure 3:
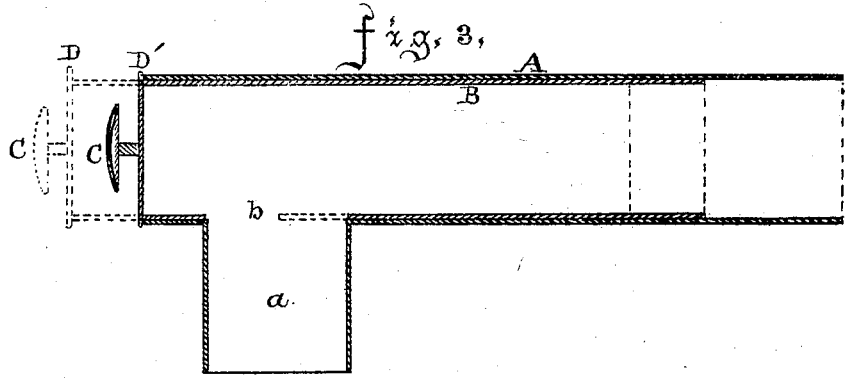

Figure 1 is a side view with the ventilator open. Fig. 2 is a detached view of the damper. Fig. 3 is a side view, the ventilator partially drawn in dotted lines.

My invention relates to stove-pipes; and consists in so constructing and arranging a joint of the pipe as to accomplish three important objects, viz: First, a soot-arrester; second, a damper; and third, a ventilator.

To enable others skilled in the art to make and use my invention, I will proceed to describe the exact manner in which I have carried it out.

In the drawings, A represents an elbow-joint of a stove-pipe, such as would be ordinarily connected with the top of a stove, the upright portion $a$ resting on the stove, and the horizontal portion passing into the chimney. The pipe B, Fig. 2, is made to fit snugly within the pipe A, as shown in Fig. 3, in which it can be easily turned, or from which it can be readily withdrawn. B has an opening, $b$, corresponding to the diameter of the pipe $a$, and when the two pipes are in the position shown in Fig. 1 it is evident that if the pipe B be pushed in until D and D' come together, the opening $b$ will be immediately over the opening in the vertical pipe $a$, and the draft of the pipe A will be uninterrupted. It is also evident that by turning the pipe B within the pipe A half a revolution, the draft would be completely closed, and secure against the severest winds. It is also evident that the damper may be regulated at pleasure by the simple turning of the pipe B, as desired, and the exact position of the damper can be determined by the teeth $c$ on the knob C.

When the draft is not being used—for instance, in warm weather—a very effective ventilator is formed by simply withdrawing the pipe B until the opening $b$ is clear of the pipe A, as shown in Fig. 1. In that position of the pipes the draft through $a$ is completely closed.

When it is desired to remove the soot from the horizontal pipe A, it is only necessary to turn the pipe B until the opening $b$ is on the upper side, and then withdraw and empty it.

Having thus described my invention, what I claim as new, and desire to secure by Letters Patent, is—

The pipe B, constructed as described, with the knob C and circular opening $b$, in combination with the pipe A $a$, arranged and operated substantially as and for the purpose set forth.

JOHN L. SKINNER.

Witnesses:
EDMUND R. TRAVERS,
CHAS. A. CHURCH.